United States Patent [19]

Kawasaki et al.

[11] Patent Number: 4,814,754
[45] Date of Patent: Mar. 21, 1989

[54] MONITORING SYSTEM

[75] Inventors: Kikuo Kawasaki; Hitoshi Yamamoto; Masanori Fukuhara; Kenji Asanuma, all of Kawasaki, Japan

[73] Assignee: Fuji Electric Company Ltd., Kawasaki, Japan

[21] Appl. No.: 803,210

[22] Filed: Nov. 27, 1985

[30] Foreign Application Priority Data

Dec. 1, 1984 [JP] Japan .......................... 59-181552[U]
Dec. 1, 1984 [JP] Japan ................................ 59-252821
Dec. 1, 1984 [JP] Japan ................................ 59-252822
Dec. 1, 1984 [JP] Japan ................................ 59-252823

[51] Int. Cl.$^4$ ............................................... G06F 3/14
[52] U.S. Cl. .................................... 340/706; 340/709; 340/711; 371/29
[58] Field of Search ................. 340/717, 709, 347 DD, 340/802, 803, 706; 371/29, 17

[56] References Cited

U.S. PATENT DOCUMENTS 4,064,561 12/1977 Jennings ..................... 340/324 AD
4,404,551 9/1983 Howse et al. ......................... 340/711
4,536,759 8/1985 DiMassimo et al. ................ 340/706

Primary Examiner—John W. Caldwell, Sr.
Assistant Examiner—Alvin Oberley
Attorney, Agent, or Firm—Spencer & Frank

[57] ABSTRACT

A monitoring system for a serial transmission line which analyzes serial data received from a serial transmission line on the basis of a protocol or a data format for serial transmission and converts the serial data into display data, thereby monitoring the serial data. The system converts all or a portion of the data being displayed in one coding format and displays the fresh display data (for example, data displayed in HEX coding is converted and displayed in ASCII coding).

7 Claims, 19 Drawing Sheets

○ : Serial Data

○ : Serial Data
▨ : Control Line Data

FIG. 9

| i ↓ | → j | | | JIS 8 / JIS 7 / ASCII | EBCDIC / EBCDIK |
|---|---|---|---|---|---|
| A | C | K | | 06 | 2E |
| B | Y | P | | 07 | 2F |
| B | E | L | | 08 | 16 |
| B | S | | | 18 | 18 |
| C | A | N | | | 1B |
| C | U | 1 | | | 2B |
| C | U | 2 | | | 3B |
| C | U | 3 | | | 1A |
| C | C | | | 0D | 0D |
| C | R | 1 | | 11 | 11 |
| D | C | 2 | | 12 | 12 |
| D | C | 3 | | 13 | |
| D | C | 4 | | 14 | 3C |
| D | C | L | | 7F | 07 |
| D | E | E | | 10 | 10 |
| D | L | | | | 20 |
| E | S | Q | | 05 | 2D |
| E | N | . T | | 04 | 37 |
| E | O | T | | 17 | 26 |
| E | T | B | | 03 | 03 |
| E | T | X | | 1B | 27 |
| E | S | C | | 19 | 19 |
| E | M | | | | FF |
| F | O | | | 0C | 0C |
| F | F | | | 1C | 22 |
| G | S | | | | 08 |
| H | E | | | 1D | |
| I | S | | | 09 | 05 |
| I | T | | | | 1C |
| I | F | S | | | 1D |
| I | G | S | | | 1E |
| I | R | S | | | 1F |
| L | U | | | | 17 |
| L | L | | | | 06 |
| N | C | K | | 0A | 25 |
| N | F | L | | 15 | 3D |
| P | A | | | 00 | 00 |
| P | U | | | | 15 |
|   | L | | | | 04 |
|   | F | | | | 34 |
|   | N | | | | |

| i ↓ | → j | | | JIS 8 / JIS 7 / ASCII | EBCDIC / EBCDIK |
|---|---|---|---|---|---|
| R | E | S | | | 14 |
| R | L | F | | | 09 |
| R | S | | | 1E | 35 |
| S | O | H | | 01 | 01 |
| S | O | S | | | 21 |
| S | M | | | | 0A |
| S | T | M | | 02 | 02 |
| S | U | X | | 1A | 3F |
| S | Y | B | | 16 | 32 |
| S | I | N | | 0F | 0F |
| S | M | | | | 2A |
| S | O | | | 0E | 0E |
| T | M | | | | 13 |
| U | C | | | | 36 |
| U | S | | | 1F | |
| V | T | | | 0B | 0B |

Reverse Conversion Data

| | | | | | | |
|---|---|---|---|---|---|---|
| 00H | 6EH, | 75H, | 6CH, | 00H, | 00H | ; Nul |
| 01H | 73H, | 6FH, | 68H, | 00H, | 00H | ; SOH |
| 02H | 73H, | 74H, | 78H, | 00H, | 00H | ; STX |
| 03H | 65H, | 74H, | 78H, | 00H, | 00H | ; EOT |

F I G. 10

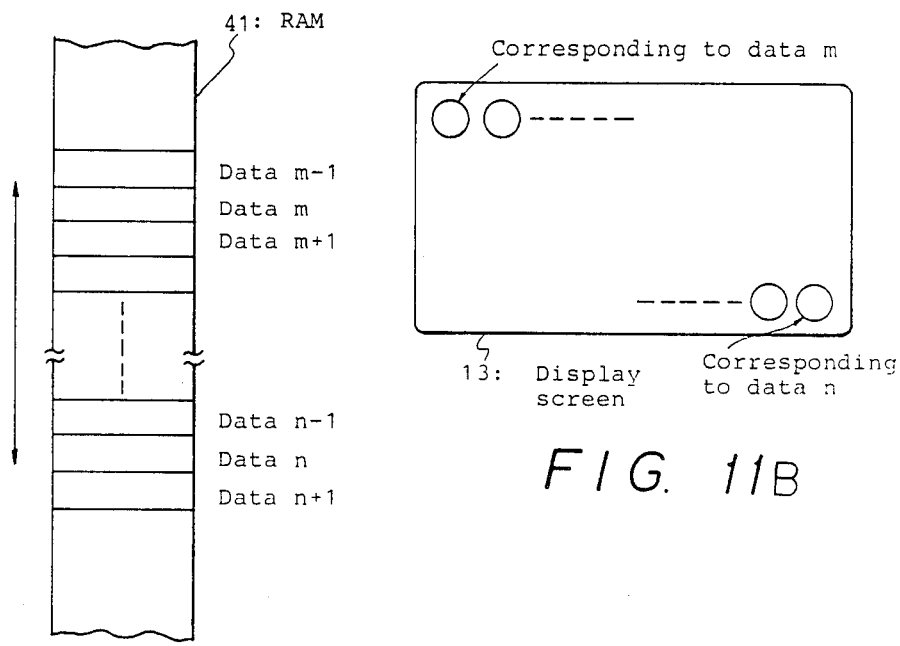
FIG. 11A
FIG. 11B
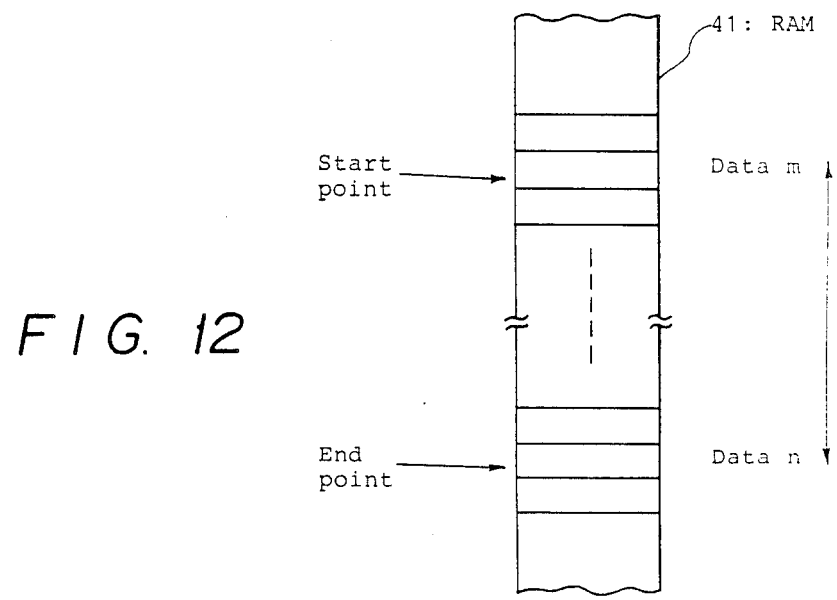
FIG. 12

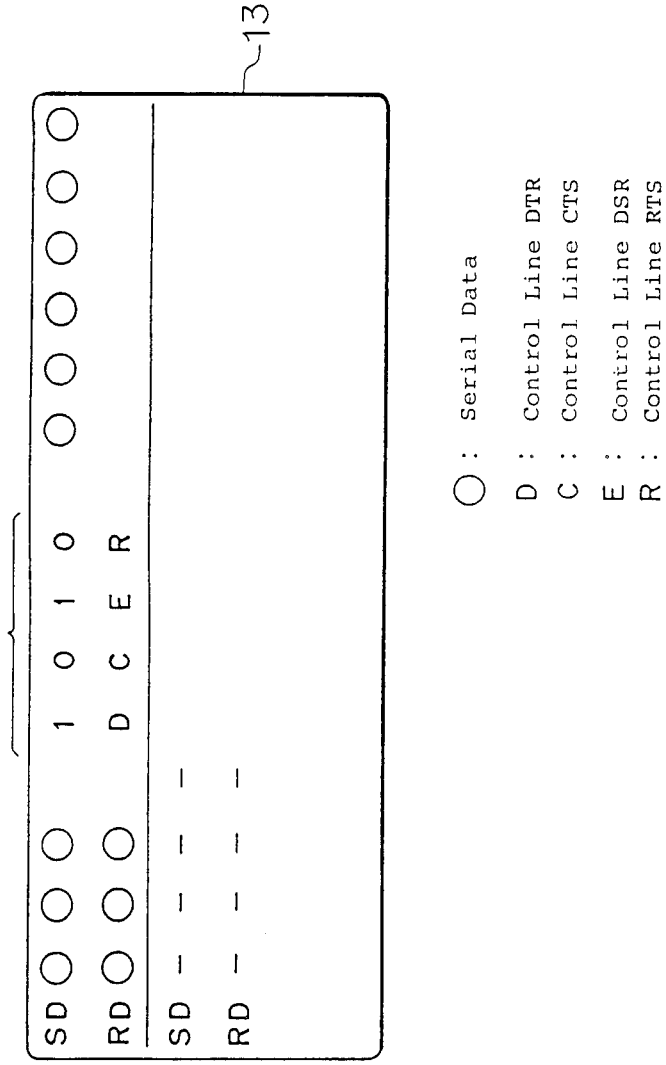

F I G. 19
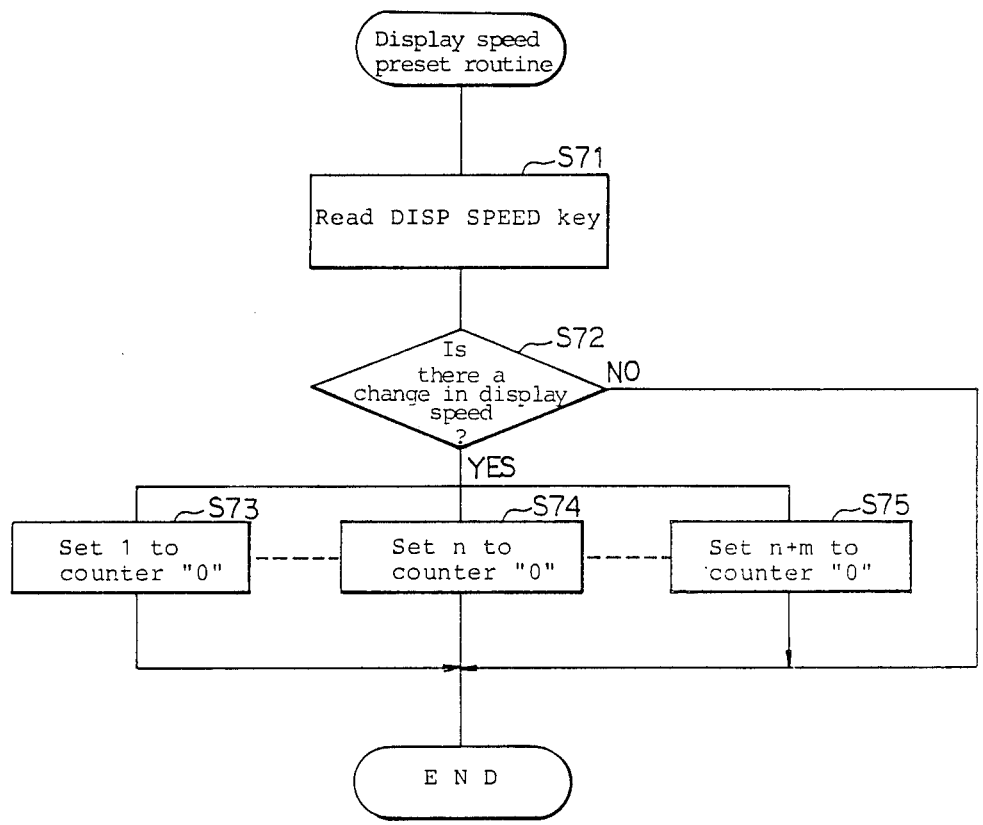

MONITORING SYSTEM

BACKGROUND OF THE INVENTION

1. Field of the Invention

The present invention relates to a monitoring system for monitoring a serial transmission line by receiving data flowing through the serial transmission line and by analyzing the received data in accordance with a predetermined protocol or data format for serial transmission.

Before discussing the present invention, we shall indicate the meaning of the following codes to be used throughout this specification.

ASCII : American Standard Code for Information Interchange

EBCDIC: Extended Binary Code Decimal Interchange Code

EBCDIK: A code created by Hitachi Co., Ltd. based on

EBCDIC.

HEX : Hexadecimal Notation Code
JIS7: Japanese Industrial Standard 7 Bit Code
JIS8: Japanese Industrial Standard 8 Bit Code 2. Description of the Prior Art Known as a monitoring system for a serial transmission line are an on-line monitor and an on-line scope. Generally in these types of monitoring system, transmission data are stored in a memory, then read successively from that memory and converted into display data in accordance with a preset protocol or format and then the thus converted data is displayed.

As long as this type of simple conversion method is used, however, an erroneous display output may occur typically in JIS7 and EBCDIK coding in which the same transmission data has different meanings depending on whether a shift-in mode is employed or shift-out mode. For example, when the JIS 7 code $41_H$ is inputted as transmission data, the alphabetic character "A" is displayed in the shift-in mode, but the katakana character "ｳ" is displayed in the shift-out mode. When the system is set so that the display output is always in the shift-in mode at the start of monitoring, and a shift-out code (SO) flows through the serial transmission line prior to the start of the monitoring, the monitoring system will display the input data in the shift-in mode (alphabet mode), making an erroneous display. This is because, even though the input data should all be outputted on the shift-out side (katakana mode), the monitoring starts after the shift-out code (SO) has flowed.

Furthermore, among the transmission data, even non-transmission type data, for example, error-checking BCC (Block Check Character) data, is transmitted as transmission type data (when the raw data has been converted into a code such as JIS8 or ASCII). In such cases, when the received data are all displayed by a predetermined code conversion, there is a defect in that it is difficult to determine the transmission type data. For example, when the received,, data is all converted into JIS8 code and displayed, if the JIS8 code is specified, the data $43_H$ received as BCC data would be converted into the character "B" and displayed, since the JIS8 code is specified. That is, when the user checks BCC, he normally checks BCC in the form of raw data (HEX), so that there is a disadvantage that the user must convert the character "B" again into HEX before checking.

Conventional monitoring systems also have the following disadvantages.

(1) Conventional monitoring systems are unable to convert the display data into other codes (for example, HEX) for monitoring.

(2) In the same manner as described above, it is not possible to convert data into other codes temporarily for monitoring.

(3) It is not possible to convert a predetermined range of the data, not the whole of the data, into another code for monitoring.

Furthermore, in the usual monitoring systems, all the received data stored in a memory are hardy required later, and in many cases the memory contains unnecessary received data. In particular, when analyzing trouble on the serial transmission line, in many cases only a limited portion of the data is really necessary.

However, conventional monitoring systems for a serial transmission line do not have a function for selecting data stored in a memory, so that in order to store a desired portion of the data, all the collected data must be stored. This causes the following disadvantages.

(1) Since unnecessary data is stored, the storage capacity which can be used in monitoring the transmission line is insufficient. Furthermore, an increase in the memory capacity to make up for this shortage leads to an increase in cost, and the use of an external storage unit such as a cassette magnetic tape recorder is inconvenient from the point of view of operation and portability.

(2) Retrieval of necessary data from data including unnecessary data leads to an increase in processing time.

(3) Storage of data in an external storage unit causes shortages of storage medium or cost increases due to increased storage capacity.

(4) When data is stored in an external storage unit, a large amount of time is needed for recording and/or reproduction processing.

In a conventional monitoring system of this type for a serial transmission line, methods such as the following have been adopted to display the condition of control line data.

(1) With respect to writing to memory: The control line data is sampled periodically while the serial data is being received and all the results of this sampling are stored in the control line data memory in the same manner as the serial data. Then, the stored control line data is read out from the memory and is reproduced on the display screen while maintaining a time relationship of the control line data with the serial data read out from the data memory.

However, this type of monitoring system is arranged so that all the sampled control line data are stored in the control line data memory. As a consequence, there is a disadvantage in that a control line data memory having a memory capacity as large as the serial data memory is necessary.

(2) With respect to the display format: When the control line data is being displayed, a display format like those shown in FIG. 1 or FIG. 2, for instance, is adopted.

The display format shown in FIG. 1 indicates the conditions of the respective control lines DTR, RTS, DSR and CTS with wave forms corresponding to the serial data series SD and RD shown by the O mark.

In the display formats shown in FIG. 1 and FIG. 2, SD denotes Send Data, RD Received Data, DSR Data Set Ready, CTS Clear to Send, DTR Data Terminal Ready and RTS Request to Send. On this display format, however, the majority of the area of the display screen is occupied by the control line data display, so that there is a disadvantage that the volume of serial data which can be displayed within the display screen is greatly reduced.

The display format shown in FIG. 2 indicates a change in the condition of the control line data by the display mode, i.e., whether the serial data is displayed in a normal dislay mode or in a reverse display mode. This display format, however, has a disadvantage in that the conditions of a plurality of control line data cannot be displayed.

Moreover, particularly when displaying received data, the above described conventional systems sometimes display the data in real time. In this case, the received data is displayed immediately.

With this type of display system, however, when the transmission speed on the serial transmission line is slow (for example, 1,200 bps (bits per second)), the user is able to confirm visually the display data even when the received data is displayed immediately. However, on the other hand, when the transmission speed is fast (for example, 19,200 bps), the user is unable to keep up with the display data when it is displayed in real time. This causes a disadvantage in that it is extremely difficult to determine the type of data which has been transmitted.

In order to avoid the above-mentioned disadvantages, a method may be considered in which the displayed data is temporarily fixed or frozen, so that the data can be measured. In this case, however, there is a disadvantage that the data display becomes intermittent and therefore it is possible to understand the mutual relationship only between data displayed on the same screen, and accordingly it is not possible to determine the relationship between data on one displayed image screen and the data on the other picture.

SUMMARY OF THE INVENTION

It is, therefore, a primary object of the present invention to provide a monitoring system for a serial transmission line which, while a code conversion is instructed, converts display data according to that code conversion instruction when monitoring is stopped and displaying that data again on a display screen.

It is another object of the present invention to provide a monitoring system for a serial transmission line which is so arranged that the system allows effective use of a recording medium and easily reproduces necessary data.

It is a further object of the present invention to provide a monitoring system for a serial transmission line which reduces the capacity of a memory for storing control line data and displays a plurality of control line data conditions on one display screen without substantially reducing the amount of serial data to be displayed.

It is a still further object of the present invention to provide a monitoring system for a serial transmission line which can select or decide a predetermined display speed regardless of the data transmission speed of the serial transmission line.

In the first aspect of the present invention, a monitoring system for a serial transmission line for receiving serial data of the serial transmission line and for displaying the data comprises:

(a) receiving means for receiving the serial data flowing through the serial transmission line;

(b) display format instructing means for designating a protocol or data format by which the received serial data are displayed (c) first conversion means for converting the received serial data into display data according to the designated protocol or data format;

(d) memory means for storing the serial data or the display data;

(e) reading means for reading out the serial data or the display data from the memory means;

(f) displaying means for accepting the serial data or the display data read out from the reading means to display visually the serial data or the display data on a display screen;

(g) conversion code specifying means for specifying a code, so that data to be displayed on the display means is converted into data in the code;

(h) second conversion means for converting data to be displayed on the display means according to the code specified by the conversion code means; and (i) output means for displaying the output from the second conversion means on the display screen of the display means.

Here, the second conversion means may have a cursor control means for instructing a range of data, the code of which should be converted, and a code conversion means for converting only data within the range according to the code.

The output means may have a video memory for storing data converted by the second conversion means, and a switching means for switching display data supplied to the display means to data in the video memory while the conversion by the second conversion means is being instructed.

The output means can be a video memory for storing data converted by the second conversion means, and a switching means for switching display data supplied to the display means to data in the video memory while the conversion by the second conversion means is being instructed.

In the second aspect of the present invention, a monitoring system for a serial transmission line for receiving serial data of the serial transmission line and for displaying the data comprises:

(a) receiving means for receiving the serial data flowing through the serial transmission line;

(b) display format instructing means for designating a protocol or data format by which the received serial data are displayed;

(c) first conversion means for converting the received serial data into display data according to the protocol or the data format;

(d) memory means for storing the serial data or the display data;

(e) reading means for reading out the serial data or the display data from the memory means;

(f) displaying means for accepting the serial data or the display data read out from the reading means to display visually the serial data or the display data on a display screen;

(g) selecting means for selecting the serial data or the display data stored in the memory means according to an instruction input;

(h) transferring means for transferring the serial data or the display data selected by the selecting means to a specified area in the memory means so that the serial data or display data is collected in the specified area; and (i) means for storing the serial data or display data received newly in the memory means subsequent to the data transferred by the transferring means to the specified area.

Here, the selecting means may have means for selecting the serial data or the display data according to a designation by a unit of the display screen of the display means.

The selecting means may have means for selecting the serial data or the display data according to a designation of an address range of the memory means.

In the third aspect of the present invention, a monitoring system for a serial transmission line for receiving serial data of the serial transmission line and for displaying the data, comprises:

(a) receiving means for receiving the serial data flowing through the serial transmission line;

(b) display format instructing means for setting a protocol or data format for serial transmission;

(c) first conversion means for converting the received serial data into display data according to the protocol or the data format;

(d) detecting means for sampling periodically control line data for the serial transmission line and comparing a result of the sampling with a result of a previous sampling to detect a condition change in the results;

(e) memory means for storing successively in time sequence the control data relating to the condition change and the serial data or the display data;

(f) reading means for reading out successively data from the memory means; and (g) displaying means for accepting the control line data and the serial data read or the display data out from the reading means, and for displaying visually in time sequence transmission side data and receiving side data of the serial data or the display data on alternate lines, respectively, and a symbol indicating a control line and a condition signal of the control line data on alternate lines, respectively.

The reading means may have a display speed instructing means for instructing a display speed, and a control means for transmitting data from the memory means to the display means according to outputs from the display speed instructing means and the display format instructing means.

The control means can control the transmission speed of data being transmitted to the display means by varying the driving clock frequency.

The control means can control the transmission speed of data being transmitted to the display means by varying the number of times that a display sequence is executed, while maintaining a driving clock frequency substantially at a constant frequency.

The above and other objects, effects, features and advantages of the present invention will become more apparent from the following description of preferred embodiments thereof taken in conjunction with the accompanying drawings.

BRIEF DESCRIPTION OF THE DRAWINGS

FIG. 9 and FIG. 10 are explanatory diagrams showing tables used for code, conversion;

FIG. 11A, FIG. 11B and FIG. 12 are memory maps showing a data selection method in an internal memory unit;

FIG. 17 is a schematic diagram showing an example of a display format of a control line data in a system according to the present invention;

FIG. 19 and FIG. 20 are flowcharts showing an example of an operation procedure of a CPU 1 when changing the display speed.

DETAILED DESCRIPTION OF PREFERRED EMBODIMENTS

Figure 1:
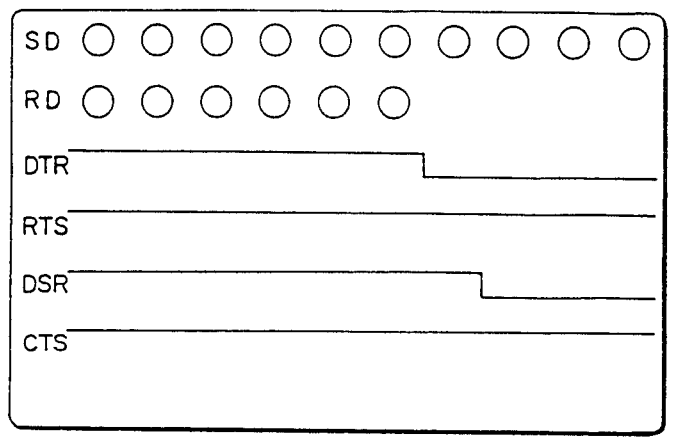
FIG. 1 and FIG. 2 are schematic diagrams showing a display format of a conventional control line data.
Figure 2:
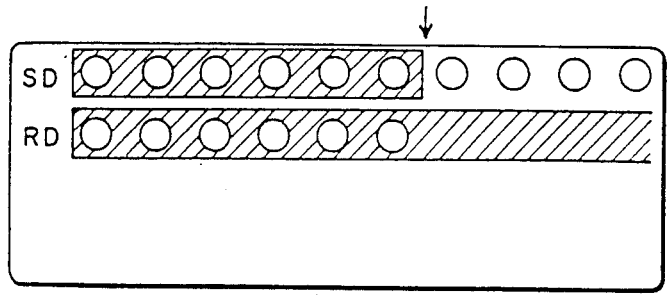
Figure 3:
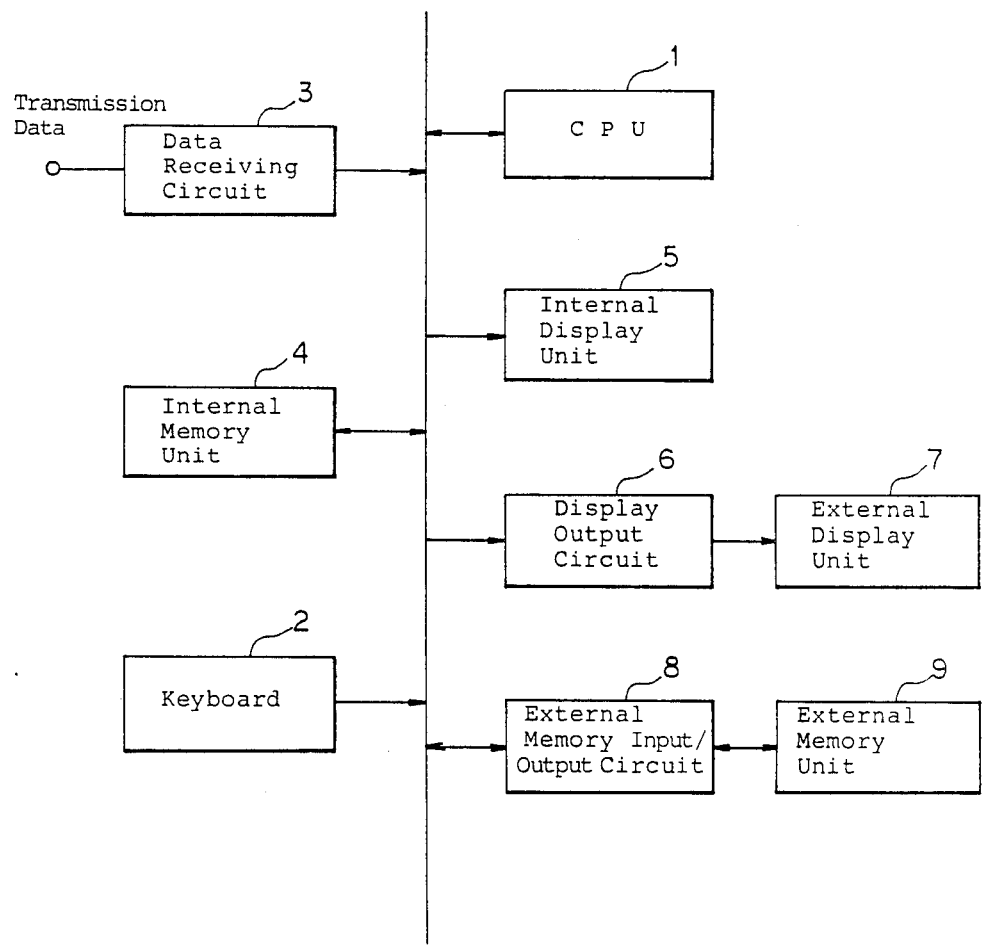
FIG. 3 is a block diagram showing an embodiment of an arrangement of a monitoring system for a serial transmission line according to the present invention.

FIG. 3 is a block diagram showing an embodiment of a monitoring system for a serial transmission line according to the present invention. In FIG. 3, reference numeral 1 denotes a CPU, reference numeral 2 a keyboard, reference numeral 3 a data receiving circuit, reference numeral 4 an internal memory unit, reference numeral 5 an internal display unit, reference numeral 6 a display output circuit, reference numeral 7 an external display unit, reference numeral 8 an external memory input/output (I/O) circuit and reference numeral 9 an external memory unit. A $\mu$PD7807 manufactured by NEC can be used as the CPU 1. A $\mu$PD7201 (a serial data communication I/O unit) manufactured by NEC can be used as the data receiving circuit 3.

The CPU 1 receives transmission data through the data receiving circuit 3. Then, the received data is processed as it is, or according to contents preset by pressing a key included in the keyboard 2 in advance. The data is then stored in the internal memory unit 4 which may be a RAM or the like. Next, the CPU 1 reads out the data from the internal memory unit 4, and then processes the data as it is, or according to a protocol or a data format preset from the keyboard 2, so that the data becomes display data. Then, the display data is outputted through the internal display unit 5 and the display output circuit 6 to the external display unit 7.

The CPU 1 also functions to read out data from the internal memory unit 4, and to output the data through the external memory I/O circuit 8 to an external memory unit 9 such as a cassette tape recorder. Consequently, when the memory capacity of the internal memory unit 4 is insufficient, the above-mentioned functions can be executed so that the memory contents can be saved. Furthermore, the CPU 1 also functions to read data recorded from the external memory unit 9 through the external memory I/O circuit 8, and to store that data again in the internal memory unit 4.

Figure 4:
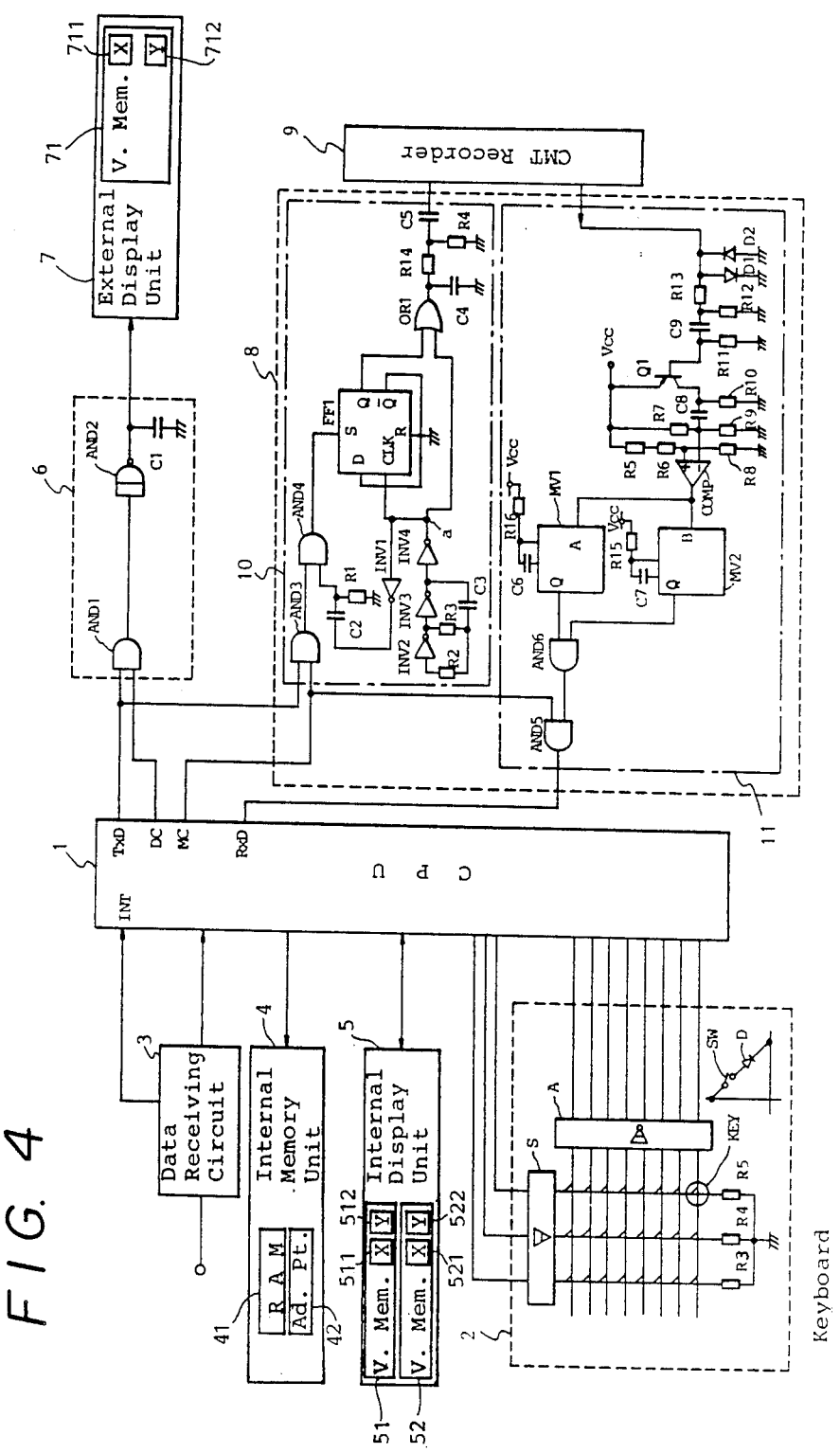
FIG. 4 is a block diagram showing an embodiment of a detailed arrangement of a portion of a monitoring system for a serial transmission line according to the present invention.

FIG. 4 shows an embodiment of a detailed arrangement of a monitoring system for a serial transmission line according to the present invention.

The internal memory unit 4 has a RAM 41 and an address pointer 42. The internal display unit 5 may have video memories 51 and 52, which have X counters 511 and 521 and Y counters 512 and 522 for controlling storing address, respectively. The external display unit 7 may have a video memory 71 having an X counter 711 and a Y counter 712 for controlling storing address. These video memories and counters will be explained in detail later.

The display output circuit 6 has AND gates AND1 and AND2 and a capacitor C1. The external memory I/O circuit 8 has an external memory input circuit 11 and an external memory output circuit 10.

The external memory input circuit 11 has monostable multivibrators MV1 and MV2, AND gates AND5 and AND6, a comparator COMP, a transistor Q1, diodes D1 and D2, resistances R5—R13, R15 and R16, and capacitors C6—C9.

The external memory output circuit 10 has a flip-flop FF1, AND gates AND3 and AND4, an OR gate OR1, inverters INV1—INV4, resistors R1—R4 and R14, and capacitors C2—C5.

In order to display data on the external display unit 7, a DC terminal on the CPU 1 is set to high logic level "1" so that the AND gate AND1 in the display output circuit 6 is opened and data can be outputted to the external display unit 7. A CRT (cathode ray tube) which is generally available on the market can be used as the external display unit 7.

On the other hand, in FIG. 4, a cassette tape recorder 9 is shown as the external memory unit 9. In order to output data to this cassette tape recorder 9 to record the data therein, data recording according to the FSK (frequency shift keying) method is performed in which, when data from a TXD terminal of the CPU 1 is at high logic level "H", the data is outputted to the cassette tape recorder 9 at a frequency at point a shown in the external memory output circuit 10 of the external memory I/O circuit 8. When the data is at low logic level "L", the data is outputted to the cassette tape recorder 9 at a frequency equal to one-half of the frequency at the above-mentioned point a.

On the other hand, when reproducing recorded data from the cassette tape recorder 9, first the waveform of a reproduced data signal is shaped by the transistor Q1 in the external memory input circuit 11 which is part of the external memory I/O circuit 8, and is then restored to the data signal waveform as of before the frequency shift keying was performed during the data recording described above by the monostable multivibrators MV1 and MV2. That restored data is inputted to an RxD terminal of the CPU 1.

In the CPU 1, at the same time as the data inputted from the R×D terminal is being outputted from a T×D terminal to the external display unit 7, it is also outputted to be stored in the internal memory unit 4.

If a CRT is used as the external display unit 7, in case of displaying data on the external display unit 7, the CRT display unit is convenient for a display of larger display characters than on the internal display unit 5.

Moreover, the same data can be displayed simultaneously on the internal display unit 5 and on the external display unit 7, so that a plurality of users can view the data easily.

The keyboard 2 has a key matrix having a plurality of key switches SW, diodes D and resistors R3—R5, a strobe output circuit S and an amplifying circuit A. The condition of the row of key switches SW in the key matrix to which a voltage is applied by the strobe output circuit S is read into the CPU 1.

Figure 5:
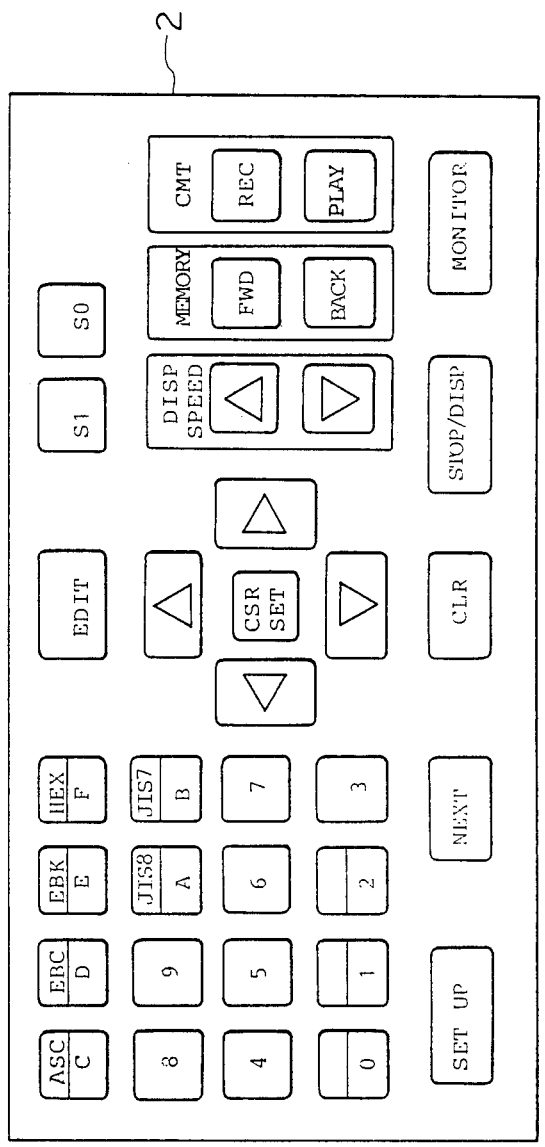
FIG. 5 is a plan view showing an arrangement of keys on a keyboard.

FIG. 5 shows an example of an arrangement of keys on the keyboard 2 used in the monitoring system according to the present invention. In FIG. 5, the keys have the following functions.

EDIT: An editor key which is operated when editing data in the internal memory unit 4.
SI : A shift-in key for changing the screen display to shift-in.
SO: A shift-out key for changing the screen display to shift-out.
CSR SET: A cursor set key portion having up, down, left and right keys which are operated to move a cursor upward, downward, leftward and rightward, respectively, in a set mode or when stopping monitoring.
DISP SPEED: A display speed key portion having up and down keys which are used to adjust the display speed upward and downward, respectively.
MEMORY: A memory key portion having FWD and BACK keys which are used to display data after and before the display data, respectively.
CMT A cassette recorder key portion having REC and PLAY keys which are used to record into the cassette data recorder and reproduce from the cassette data recorder, respectively.
SET UP: A set mode key which is used to change the mode setting and predetermined function of the monitoring system.
NEXT: A next key which is used when displaying the next screen in the set mode.
CLR: A clear key which is used to erase numeric set data and to clear edited data.
STOP/DISP: A display stop key which is used to stop monitoring and to stop a data recorder.
MONITOR: A monitor key which is used when executing monitoring.
ASC: Used to specify the code as ASCII.
EBC: Used to specify the code as EBCDIC.
EBK: Used to specify the code as EBCDIK.
HEX: Used to specify the code as HEX.
JIS8 : Used to specify the code as JIS8 .
JIS7: Used to specify the code as JIS7.

In a monitoring system according to the present invention, transmission data on a serial transmission line is directed to the data receiving circuit 3 under the control by the CPU 1. Then, that received data is stored in the internal memory unit 4 at respective addresses or with a predetermined mark affixed according to the division between the transmission side and the receiving side.

The recorded data in the internal memory unit 4 is analyzed according to a predetermined protocol or conversion code in response to the function setting from the keyboard 2, and then outputted to the internal display unit 5 and/or the external display unit 7 in a format which can be used easily by the user of the monitoring system.

FIGS. 6A and 6B and FIGS. 7A, 7B, 7C and 7D show examples of a display code conversion according to the present invention.

Figure 6A:
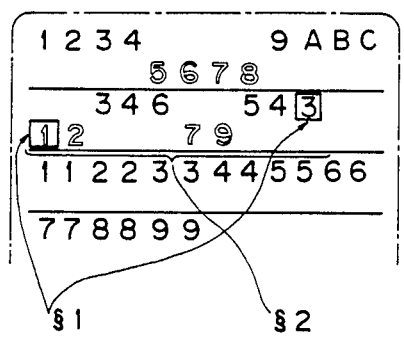
FIG. 6A, FIG. 6B, FIG. 7A, FIG. 7B, FIG. 7C and FIG. 7D are explanatory diagrams showing a display format when a code is being converted.
Figure 6B:
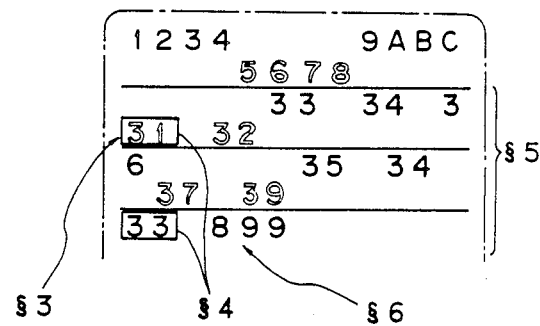

FIG. 6A and FIG. 6B illustrate a conversion from JIS8 to HEX.

FIG. 6A shows an example of a display before the HEX key is pressed, and when the HEX key is released. FIG. 6B shows an example of a display while the HEX key is being pressed. In these drawings, the mark "∫" expresses the following comments.

§1: Cursor performing a blinking display. (1) on the left is the start of blinking in the two lines displayed simultaneously and (3) on the right is the end of blinking. It is understood that JIS8 code is set in FIG. 6A.

§2: Convert and display this range.

§3: Arrange display positions corresponding to FIG. 6A and display at the positions.

§4: Blinking display of conversion data instructed by cursor.

§5: When the number of data, of which conversion is instructed, is large, display and conversion may not be possible at once.

§6: The display data in FIG. 6A remain unchanged and are displayed as they are. Conversion results are displayed in an overlapped manner.

When converting between character codes (for instance, from JIS8 to EBCDIC), data which do not have a character allocation in the destination code are displayed in HEX. The display format is "⊔B1⊔". That is, spaces "⊔" are displayed before and after the data, and this format displays data for one character.

When a plurality of conversion keys are pressed simultaneously, the conversion keys are enabled according to the descending order of priority. The order of priority is as follows:

First: JIS8
Second: JIS7
Third : ASCII
Fourth: EBCDIC
Fifth : EBCDIK
Sixth : HEX Further, the SI and SO keys are enabled even during the operation of the conversion keys.

Figure 7A:
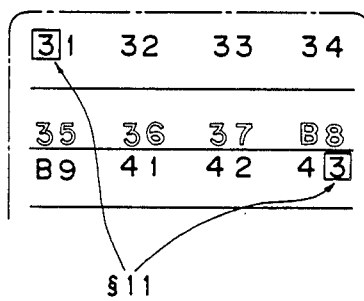
Figure 7B:
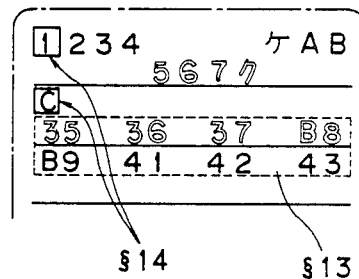
Figure 7C:
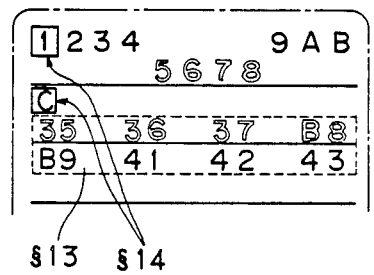
Figure 7D:
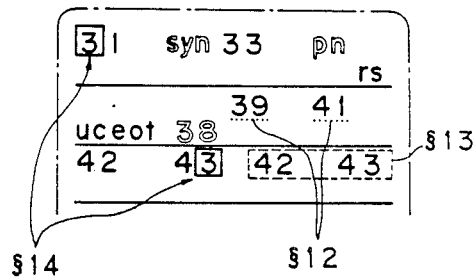

FIGS. 7A, 7B, 7C and 7D illustrate one example of a code conversion from HEX to another code. FIG. 7A illustrates an example of displaying HEX. FIG. 7B illustrates an example of displaying JIS8. FIG. 7C illustrates an example of displaying ASCII. FIG. 7D illustrates an example of displaying EBCDIC. In these drawings, the mark '§" expresses the following comments.

§11: Cursor starts (31) and ends at (43).

§12: Data without a character allocation are displayed as they are in HEX.

§13: The conversion results are overlapped and displayed, so that when converting from HEX code to a JIS code, for instance, the number of display digits is reduced and accordingly a portion of the section being converted are displayed in both JIS and HEX (the portion encircled by a dotted line).

Further, the cursor moves to the final data position after conversion.

§14: The conversion data instructed by the cursor is displayed in a blinking manner.

FIG. 6A shows a display in JIS8 code. When the specific key for HEX conversion is pressed, the display data is converted to HEX code which are displayed as shown in FIG. 6B. It is to be noted, however, that all the display data in FIG. 6A are not converted, and only data in the predetermined range instructed by the cursor (the range defined between the start and end cursors) is converted into HEX. At this time, a single digit of JIS8 code becomes two digits in HEX after conversion from JIS8 code to HEX code, so that the display area is expanded as shown in FIG. 6B. Consequently, a portion of preexisting data which is not subject to this conversion is also overlapped with HEX code.

The embodiment of the monitoring system according to the present invention has the six types of code conversions of JIS7, JIS8, ASCII, EBCDIC, EBCDIK and HEX, and conversion can be made between desired codes. The conversion keys for each code are assigned to the keys included in the keyboard 2 shown in FIG. 5. While any one of these keys is being pressed, the data in the instructed range is converted into the instructed code.

The following display situations can be supposed after code conversion:

(1) When the conversion key is pressed, the display data is converted into a desired code, and that converted code is maintained thereafter.

(2) Code conversion is performed only for a predetermined time after the conversion key has been pressed.

Considering that these conversion methods have advantages and disadvantages, the present embodiment employs a code conversion manner in which code conversion is performed only while the conversion key is being pressed.

Next, an explanation will be made of an arrangement for realizing this type of code conversion. In the monitoring system according to the present invention, the two video memories 51 and 52 having the size of the display screen are disposed in the internal display unit 5. The video memory 51 is used to store the data currently being displayed, and the video memory 52 is used to store the data on which code conversion has been performed.

X and Y counters are disposed in the video memories 51 and 52, respectively. When one of the code conversion keys is pressed, data currently being displayed is removed successively from the video memory 51 as specified by the X counters 511 and 521 and Y counters 512 and 522, and is judged as to whether it is data within the conversion range or not. Data which is within the conversion range is converted into the code of the code conversion key which is being pressed. Other data are stored in the video memory 52 as they are as specified by the X and Y counters 521 and 522.

When the data has been stored in the video memory 52, the display on the internal display unit 5 is switched from the video memory 51 to the video memory 52, so that the converted data is displayed. When the code conversion key is released, the display on the internal display unit 5 is switched from the video memory 52 to the video memory 51.

The above operation procedure is realized by a program of the CPU 1. Examples of flowcharts according to this program are shown in FIGS. 8A and 8B.

An explanation of the sequence of that program will be made below.

Figure 8A:
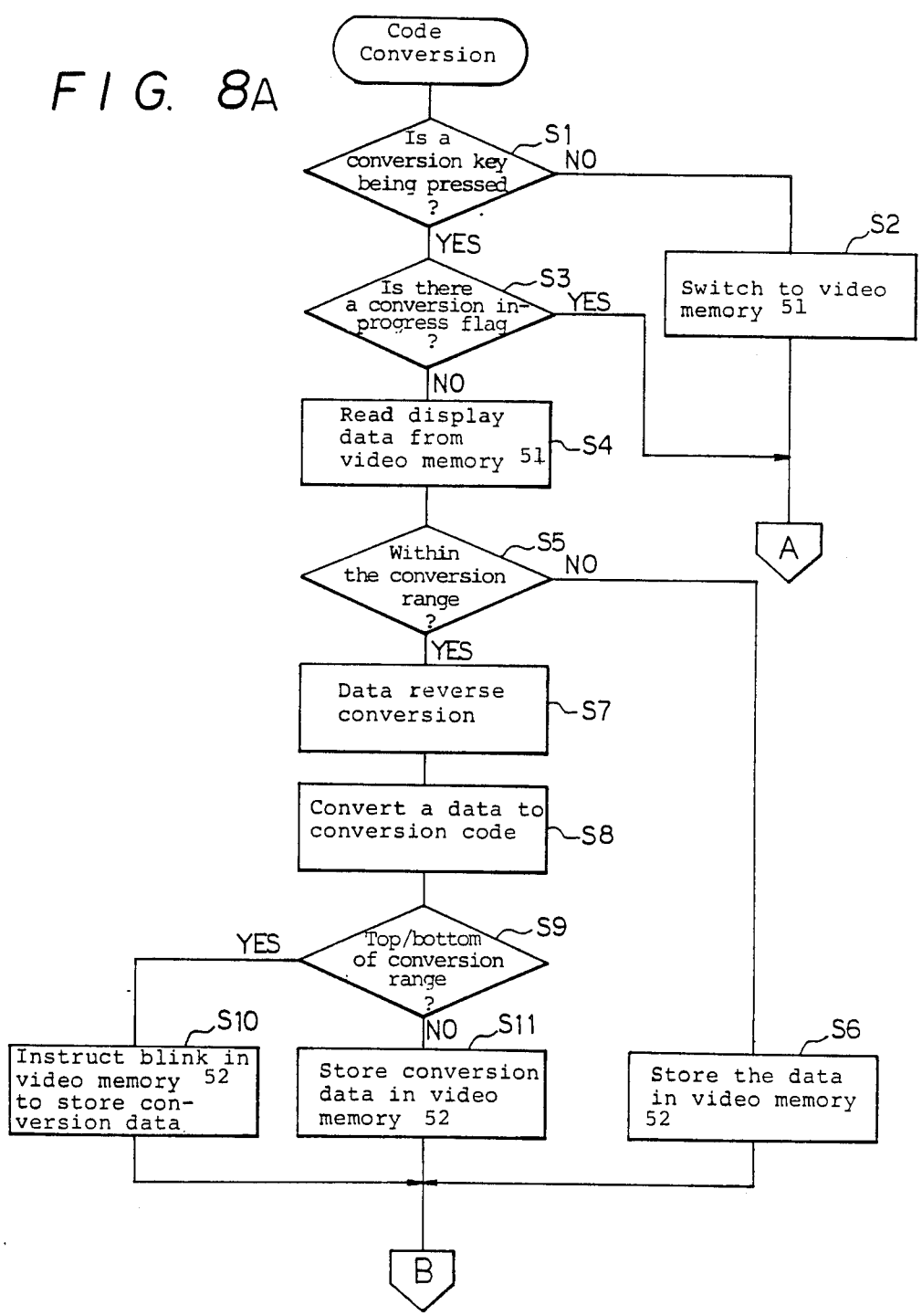
FIG. 8A and FIG. 8B are flowcharts showing one example of an operation procedure of a CPU 1 when a code is being converted.
Figure 8B:
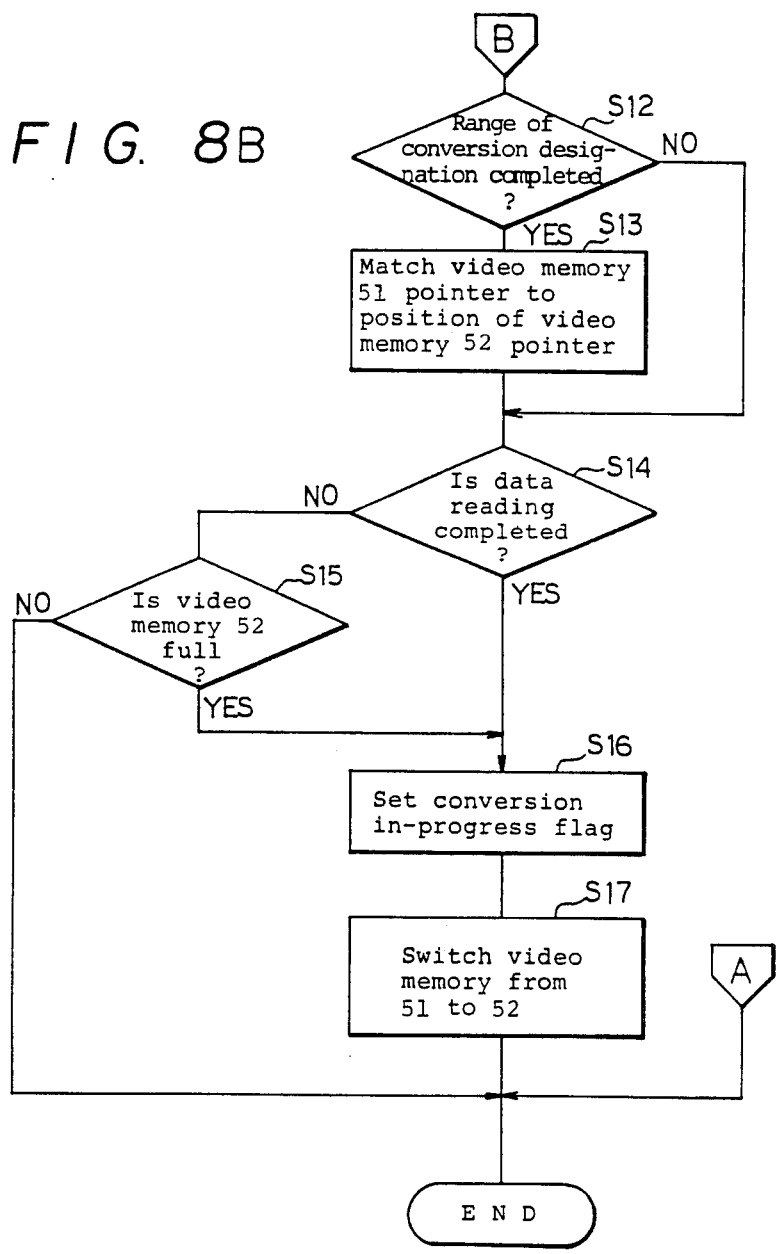

In the flowcharts in FIGS. 8A and 8B, first at step S1, the program judges whether or not a conversion key (one of ASC, EBC, EBK, HEX, JIS7 or JIS8 key in FIG. 5) is being pressed. If a conversion key is not being pressed, the program advances to step S2 and the data in video memory 51 is displayed. When a conversion key is being pressed, the program advances to step S3, in which the program judges whether or not there is a conversion in-progress flag. This conversion in-progress flag is set when the video memory 52 becomes full, or when reading of data from the video memory 52 is completed.

If the conversion in-progress flag is set, the program ends without performing conversion processing. On the other hand, when the conversion in-progress flag is not set, the program advances to step S4 to read data from the video memory 51, and then at step S5, judges whether the read data is within the conversion range or not. When, for example, the conversion range is instructed by a cursor, this judgment is performed by comparing the value of the X and Y counters when the data is read out from the video memory 51, and the value of the X and Y counters showing the position of the cursor.

When the read data is judged not to be within the conversion range, the program advances to step S6 where the data is stored as it is into the video memory 52. When the read data is judged to be within the conversion range, the program advances to step S7 where data reverse conversion is performed.

This data reverse conversion is performed by referring to tables. Those tables are arranged, for example, as shown in FIG. 9. Data reverse conversion is performed by comparing each byte of the data read out from the video memory 51 by referring to the tables. When this comparison is completed, the data read out from the i-th position in the table is outputted as a reverse code conversion value. For example, supposing that the characters for the read data are "ACK" (top of the table in FIG. 9), this corresponds to the position when i=1. "06" and "2E" are outputted as reverse code conversion values in accordance with the designation of JIS8, JIS7, ASCII, EBCDIC or EBCDIK code.

Next, the program advances to step S8, and the reverse code conversion values are converted into conversion codes. This data conversion also uses a table as shown in FIG. 10. FIG. 10 shows the table for data conversion. The table in FIG. 10 is used in EBCDIC conversion, and is so arranged that each data is expressed in five bytes with respect to the reverse code conversion values 00H—FFH (H is a symbol representing hexadecimal notation). For example, supposing that the reverse code conversion value is 01H, then the data selected are "73H, 6FH, 68H, 00H, 00H", and SOH is used as the character.

Next, in step S9, the program judges whether the converted data is at the top or at the bottom of the conversion range. If the data is at the top or the bottom, a blinking instruction is stored into the video memory 52 so as to blink the display. If the data is neither at the top nor the bottom, it is stored as it is into the video memory 52.

At step S12, the program judges whether or not the conversion range is completed. If the conversion range is completed, the pointer position (the values of the X and Y counters 521 and 522) of the video memory 52 is matched to the pointer position (the values of the X and Y counters 521 and 512) of the video memory 51 at step S13. This makes it possible to superimpose data which has not been converted as in §6 of FIG. 6B and §13 of FIGS. 7B, 7C and 7D.

At step S14, the program judges whether or not reading of data from the video memory 51 has been completed. If the reading has been completed, the program sets the conversion in-progress flag at step S16, and then switches from the video memory 51 to the video memory 52 at step S17, so that the conversion code is displayed. When the program judges that data reading has not been completed at step S14, next it judges at step S15 whether or not the video memory 52 is full. If the video memory 52 is full, the program advances to steps S16 and S17 to display the conversion code. When the video memory 52 is not full, the program returns to step S1, and then performs the same processing for the remaining data in the video memory 51. When the conversion key is released, the program judges "NO" at step S1, so that it advances to step S2 to display the data in the video memory 51.

For code conversion of data displayed on the external display unit 7, it is sufficient that a single video memory 71 is disposed in the external display unit 7, and the data in the video memories 51 and 52 disposed in the internal display unit 5 is transferred to this single video memory 71. The transfer is controlled by the X counter 711 and the Y counter 712 provided in the video memory 71.

The advantage of instructing the range of code conversion by using the cursor is that the variation in data length produced by code conversion contributes to eliminating the inconvenience that the desired data portion moves on the display screen. When a cursor does not instruct a specific portion, all the data on the display screen are converted into a desired code.

Adoption of this method allows for code conversion and measurement of data irrespective of an instructed code during monitoring, so that there are advantages of performing code conversion according to need, and of monitoring data in a correct code during reproduction, even when the instructed code is confused.

As mentioned above, JIS7 and EBCDIK codes have SI (shift-in) and SO (shift-out) modes. The same method as just described is also applicable to the conversion into and display in SI mode or SO mode only while the SI key or the SO key is being pressed when reproducing the display screen. To monitor this SI mode and SO mode correctly, unless these data are read in before the start of monitoring, it is not possible to judge whether it is SI mode or SO mode, unless the data are read in prior to the monitoring.

When actually performing monitoring, however, that monitoring may start immediately after the function setting of the monitoring system is completed, so that it may not always be possible to receive the SI signal or the SO signal before the monitoring starts. Furthermore, when the transmission side of the monitor line receives the signals for the SI mode or the SO mode, there are several stages such as the receiving side has failed to receive any signals at all.

For these reasons, the monitoring system according to the present invention performs receiving as if wholly set to the SI mode at the start of monitoring, and switches the screen display between SI mode and SO mode only while either the SI key or the SO key is being pressed. These operations are exactly the same as those for code conversion.

When the conversion key is released, the original memory data is displayed on the screen, so that even when the key is erroneously operated, no defects occur such as the original memory content is modified.

In the monitoring system according to the present invention, when the monitoring of the serial transmission line has been completed, and the series of transmission data has been stored in the internal memory unit 4, when that stored data is displayed on the internal display unit 5 or the external display unit 7, the operation of the EDIT key on the keyboard 2 makes it possible to designate and select the really necessary data among the series of data stored in the memory.

Next, an explanation will be made of an example of this selection.

(1) All the data being displayed on a screen of the internal display unit 5 or the external display unit 7 is stored as one unit. That is, as shown in FIGS. 11A and 11B, data m through data n which are stored in the RAM 41 included in the internal memory unit 4 and which correspond to the displayed data from the top to the bottom of the display screen 13 is stored as one unit.

(2) All the data in the range between the designated starting address and the designated end address are stored as one unit. That is, as shown in FIG. 12, the data from data m to data n in the RAM 41 are stored as one unit.

These methods of designation can be realized by several methods using the ten-keys, the cursor key or the like in combination with the software of the CPU 1.

When the above-mentioned selection is completed, the editing procedure is performed by using the EDIT key. One example of this editing procedure is explained below.

Figure 13:
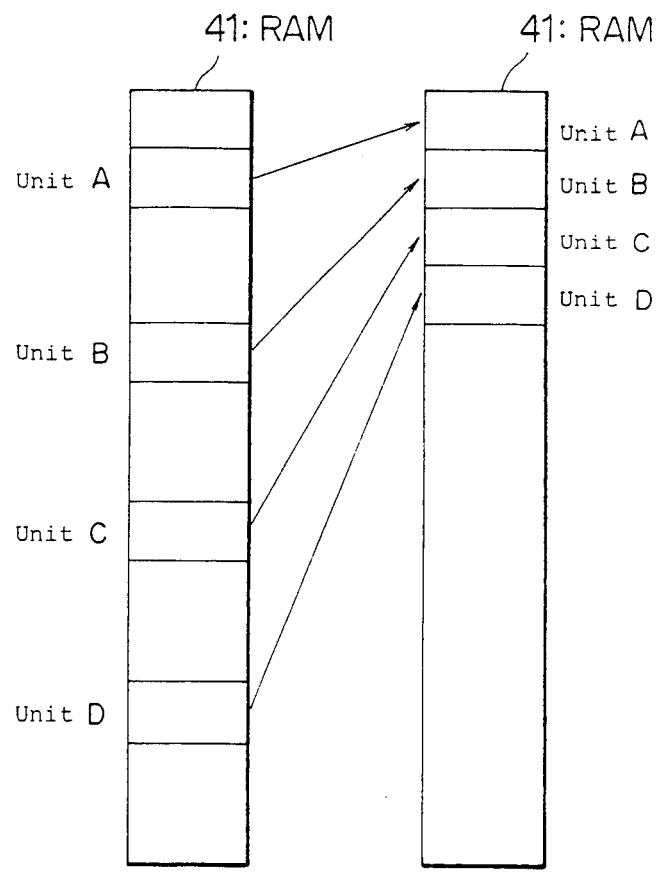
FIG. 13 and FIG. 14 are memory maps showing a transfer and a deletion of data in an internal memory unit.

(1) A plurality of units of necessary data in the RAM 41 are transferred at once, and are collected in a predetermined address. That is, as shown in FIG. 13, the four selected unit data (A—D) are transferred.

Figure 14:
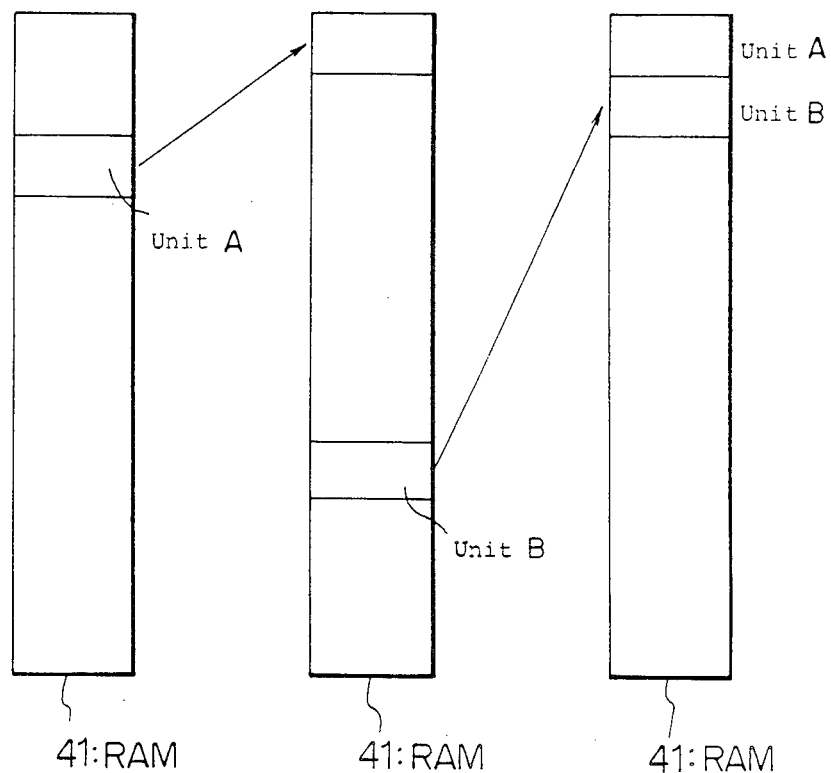

(2) Each time that a unit of data is selected, it is transferred to a predetermined direction and accumulated. That is, as shown in FIG. 14, the unit data A selected first is transferred to the top address in the RAM 41, and the data that was previously stored in that location is deleted. Since there is no change in other data, the unit data B is transferred to the address following the address where the unit data A is stored, and the data that was previously stored in that location is deleted.

When the transfer of unit data and editing the transferred data are completed in this manner, the address pointer 42 indicating the write position of the internal memory unit 4 moves to the address next to the address for the last unit data which was edited. The address pointer 42 positions at the address after the unit D in FIG. 13, and at the address after unit B in FIG. 14. Accordingly, when the data received next by the data receiving circuit 3 is stored in the internal memory unit 4, it is stored from the address following the edited data. This means that inside the internal memory unit 4, data that is not edited is deleted by storing and rewriting data that is newly received.

Next, a specific explanation will be made of how useful is the "function for selecting and transferring necessary data".

Let us suppose that the internal memory unit has a storage capacity of 100 Kbyte, and consider what happens when a serial transmission data is monitored and is stored.

There are two possibilities in this case:

(1) The data displayed by monitoring the transmission line can be confirmed visually.

(2) The fast speed of data on the transmission line results in that visual confirmation is not possible. In the case of (2) above, monitoring stops when an amount of monitored data reaches 100 Kbyte, and thereafter, the data already stored in the memory must be reproduced and confirmed visually. To prevent such a situation, it can be considered to store the data in an external memory unit, but carrying an external memory unit is inconvenient particularly in the case of on-site work.

In such situations, use of the editing functions according to the present invention allows for effective use of memory. For example, supposing that only 1 Kbyte data are really necessary of the above-mentioned 100 Kbyte of data, and that the remaining 99 Kbyte data are unnecessary, application of the present invention makes it possible to specify and store only 1 Kbyte of data, and to use the remaining 99 Kbyte of memory for monitoring. In this way, when there is necessary data by one kilobyte units, 99 units of data can be stored.

Moreover, effective use of memory is also possible by not monitoring all 100 Kbyte at once, but by, for instance, storing first 20 Kbyte in the memory, then monitoring 30 Kbyte next, and then specifying and storing the necessary data portion.

Next, an explanation will be made of the function performed by the CPU 1 for displaying control line data.

Serial data is inputted to the CPU 1 from the serial transmission line through the data receiving circuit 3, and is stored in time sequence in the internal memory unit 4. Further, the condition of the control line data for the serial transmission line is read through the data receiving circuit 3, whenever serial data is inputted, or periodically, and then is compared with the results of the previous read control line data. Then, when the result of this comparison indicates that the condition of the control line data has changed, that control line data is stored in the memory where the transmission line serial data is stored in time sequence.

Figure 15:
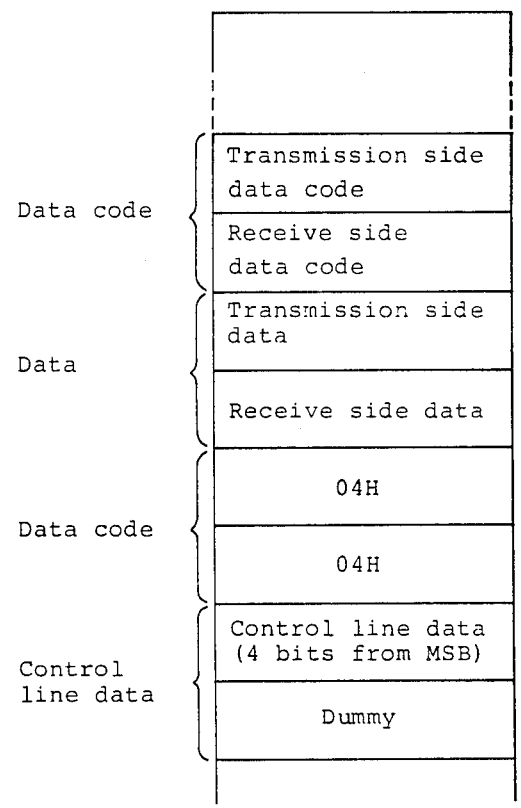
FIG. 15 is a memory map showing a storage condition of a control line data in an internal memory unit.

FIG. 15 is a memory map showing the storage condition of control line data in the internal memory unit 4. This arrangement is so constructed to display data in units of four bytes. An information code is attached to indicate whether the following data is serial data or control line data. Here, "04H" is used as the information code for control line data.

Figure 16:
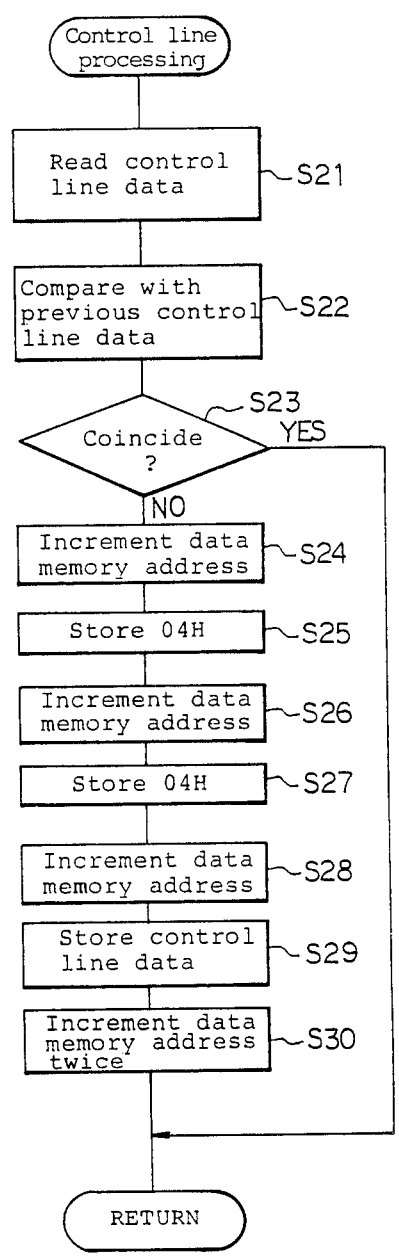
FIG. 16 is a flowchart showing an example of an operation procedure of a CPU 1 when storing a control line data in an internal memory unit.

FIG. 16 is a flowchart of the operation procedure of the CPU 1 when storing control line data in the internal memory unit 4. An explanation of the operation procedure of the CPU 1 will be made with reference to this flowchart.

First, control line processing starts as interrupt processing at predetermined intervals. At step S21, the control line data is read. At step S22, this read control line data is compared with the previous control line data that is already stored in a predetermined area of the internal memory unit 4. The result of this comparison is judged at step S23. When the results match coincide with each other, it is judged that there has been no change to the control line data and accordingly the control line processing ends.

When the results do not coincide with each other at step S23, the data memory address shown in FIG. 15 is incremented at step S24, and then at step S25 "04H" is stored in the location of the incremented address as a data code. At steps S26 and S27, the same operations as at steps S24 and S25 are performed, so that "04H" is stored in two locations as a data code as shown in FIG. 15.

Next, after the address is incremented at step S28, the control line data is stored at step S29. At this time, the four bits on MSB side of the eight bits are used as control line data, and the data corresponding to DTR, CTS, DSR and RTS are stored, respectively. Next, at step S30, the address is incremented twice, so that the next address after the control line data becomes a dummy as shown in FIG. 15. This dummy is provided because one unit is formed by four bytes.

FIG. 17 shows the display format of the control line data on the display screen 13. In FIG. 17, the transmission data (SD) and the receive data (RD) are so arranged that they are displayed on alternate lines, and the circle mark indicates serial data. On the receive data side, the control line data are represented by the letters "D", "C", "E" and "R" indicating DTR, CTS, DSR and RTS, respectively, and on the transmission data side, the data "1" and "0" are displayed to indicate the respective conditions. Here, "1" indicates ON condition, and "0" OFF condition.

Figure 18A:
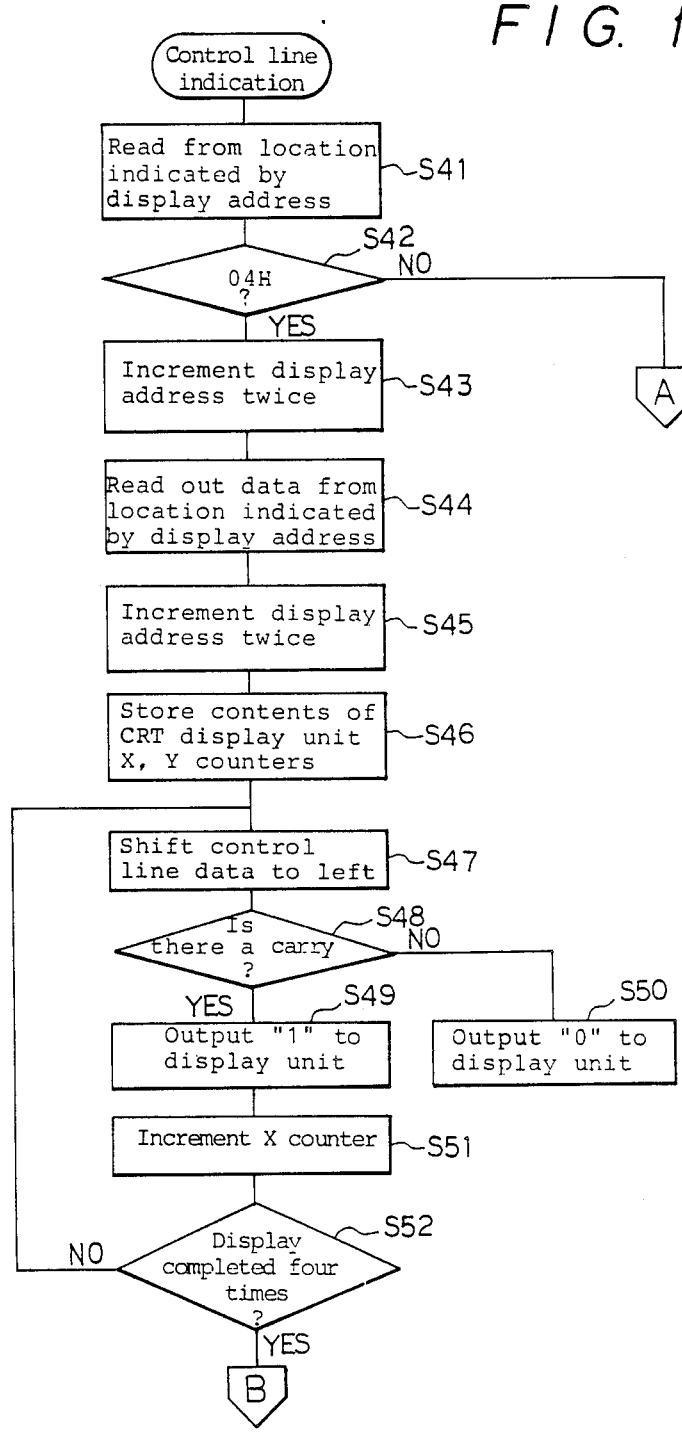
FIG. 18A and FIG. 18B are flowcharts showing an example of an operation procedure of a CPU 1 when displaying a control line data of an internal memory unit.
Figure 18B:
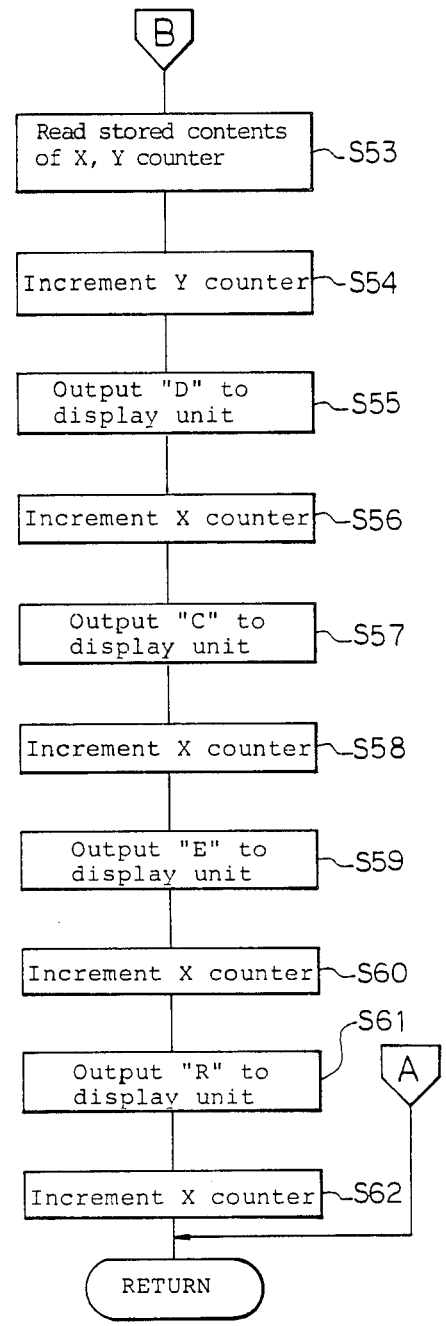

FIGS. 18A and 18B are flowcharts showing the operation procedure of the CPU 1 for displaying in the display format shown in FIG. 17 the control line data stored in the data memory as shown in FIG. 15. The monitor system according to the present invention is so arranged that the output position of data to the display unit is determined by the count values of the X and Y counters (X designates the horizontal direction, and Y the vertical direction).

In the flowcharts shown in FIGS. 18A and 18B, the display of the control line data is so programmed that the control data (1, 0, 1, 0) is outputted first, and then the X counter is cleared and the Y counter advanced to output "D", "C", "E" and "R".

First, at step S41, data is read out from a data memory as shown in FIG. 15. At step S42, this read data is judged as to whether or not it is the data code "04H". If the data is not the data code "04H", the processing ends. If the data is the data code "04H", the address in the data memory is incremented twice at step S43. Accordingly, the address is designated to the location of the control line data in FIG. 15.

At step S44, the control line data is read out from a location indicated by display address.

By incrementing the data memory address twice at step S45, the preparations for the reading of the next data are performed by incrementing the display address twice. At step S46, the count values of the X and Y counters in the CRT display unit are so stored that the display position of the control line data is stored. At step S47, the control line data read out at step S44 is shifted leftward by one position, and the MSB data is taken out.

The data thus taken out is judged to determine whether or not it has a carry at step S48. If that data has a carry, "1" is outputted to the display unit at step S49. If it does not have a carry, then, "0" is outputted to the display unit at step S50.

A control line data of "1" or "0" is thereby displayed at a position designated by the X and Y counters. At step S51, the X counter is incremented so that the next display position for control line data is determined.

At step S52, the control line data is read out, and a judgment is made whether or not the display has been completed four times, that is, whether or not the display of all the control line data has been completed.

When the display has not been completed, the operations from step S47 to step S51 are repeated.

When the display of all the control line data has been completed, the routine advances from step S52 to step S53 in FIG. 18B. At step S53, the stored count values of the X and Y counters of the CRT display unit are read out. At step S54, the count value of the Y counter which has been read is incremented, so that the bottom position of the top data of the control line data being displayed is determined. At step S55, the character "D" is outputted to the specified location to be displayed.

At step S56, the count value of the X counter is incremented, so that the location next to the location where "D" is being displayed is specified. At step S57, the character "C" is outputted to this specified location to be displayed.

The same operations are repeated at steps S58 to S61 so that the characters "E" and "R" are displayed successively.

Then, finally, the count value of the X counter is incremented to prepare for the next display. These operations realize the display arrangement as shown in FIG. 17.

In this manner, the control line data which does not change very often compared to the serial data is stored in the memory only when its condition changes, thereby allowing for an extremely effective utilization of memory capacity. Consequently, the memory capacity which in the conventional art has been assigned to the control line can be reduced, or assigned to the serial data memory.

Moreover, when recording in the external memory unit 9, the amount of data which must be stored is reduced significantly, so that only a short time is required for recording and/or reproduction, and only a small amount of the recording medium is required. Furthermore, the control line data is stored in a form of being inserted between the serial line data, so that when displaying on the screen, the control line data can be displayed without losing its time relation to the serial data.

Furthermore, the condition of the control line data is displayed between the serial data only when the condition of that control line data changes, so that a plurality of lines within the display screen are not occupied exclusively to display the conditions of the control line data, and the conditions of many control line data can be displayed.

This situation means that a larger number of serial line data than in the conventional art can be displayed together with the conditions of each control line data within a limited screen area. Accordingly, the user can view these displayed data at a glance, thereby improving the convenience of monitoring and analyzing troubles of the transmission line.

In this manner, in the monitoring system according to the present invention, the CPU 1 performs data processing of data read out from the internal memory unit 4 in accordance with a protocol or a data format preset from the keyboard 2. The resulting display data is outputted to the internal display unit 5 or the external display unit 7. At this time, the display speed follows the bit rate preset from the keyboard 2. That is, the CPU 1 sets the transmission speed (frequency) of the built-in serial interface according to the display speed preset by pressing the key on the keyboard 2. For example, when the key on the keyboard 2 is pressed to preset a speed of 4800 bps, the driving frequency of the serial interface is set to 4800 Hz. The methods described above are effective when the display side apparatus and its control apparatus are controlled simultaneously.

Next, an explanation will be made of a second embodiment for specifying the display speed. In this second embodiment, the transmission speed of the serial interface incorporated in the CPU 1 is fixed (at 9600 bps, for example), and a counter "0" and a counter "1" are disposed separately in the CPU 1, so that these counters control the display speed.

Figure 20:
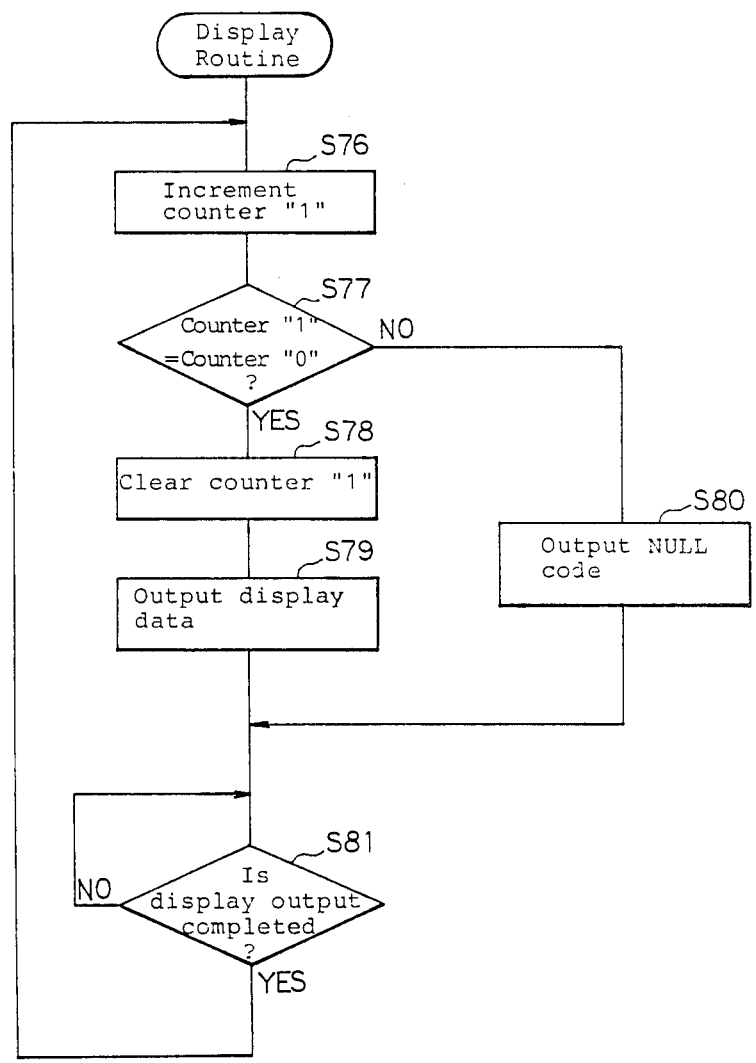

FIG. 19 is a flowchart showing an example of a routine for presetting a display speed in this second embodiment, and FIG. 20 is a flowchart showing an example of a display routine in this embodiment.

At step S71 in FIG. 19, the condition that the DISP SPEED key on the keyboard 2 shown in FIG. 5 is pressed is read to determine whether or not there is a request for a change in the display speed which is already set.

At step S72, the routine judges whether or not the display speed has been changed. When there is no change in the display speed (that is, when there is no DISP SPEED key input in step S71), the routine advances to the end.

When there is a change in the display speed, the counter "0" in the CPU 1 is set to either 1 through (n+m) as shown in steps S73 to S75 in response to the pressing condition of the DISP SPEED key. For example, supposing the counter "0" has the values from 1 to 16, pressing the up side key of the DISP SPEED key reduces each by one (that is, the step number decreases), and pressing the down side key of the DISP SPEED key increases each by one (that is, the step number increases). Accordingly, if the counter "0" is currently set at 7, pressing the down side key twice in succession changes the contents of the counter "0" to 9.

The content of this counter "0" is referenced in the display routine described below.

In the display routine in FIG. 20, the counter "1" incorporated in the CPU 1 is supposed to be preset to 0.

First, at step S76, the counter "1" is incremented by 1.

At step S77, the content of the counter "1" which was incremented at step S76 is compared with the content of the counter "0" set in the previous display speed setting routine. If the comparison results in coincidence, the routine advances to step S78.

If, on the other hand, the comparison in step S77 do not result in coincidence, the routine advances to step S80, and a NULL code "00H" which does not have any influence on the display unit 5 is outputted so as to adjust (prolong) the display time.

At step S78, the counter "1" is cleared.

At step S79, the display data is outputted and the routine advances to step S81.

At step S81, the routine judges whether or not the display data in step S79 or the output of the NULL code in step S80 is completed. If that output is not yet completed, the routine stands by until that output is completed.

When the output of the display data or the output of the NULL code is completed, the routine returns to step S76.

In this manner, this second embodiment makes it possible to change the display speed by changing the value of the counter "0", even if the transmission speed of the serial interface is fixed. For example, when 2 is set in the counter "0", step S79 (display data output) is executed only once while the display routine is processed twice, so that the display speed decreases to one half of that when 1 is set in the counter "0".

In the above explanation, the values of the counter "0" were supposed to be between 1 and 16, but these values can be changed as convenient in accordance with the range of the display control speeds.

What is claimed is:

1. A monitoring system for a serial transmission line for receiving serial data of said serial transmission line and for displaying said data comprising:
   (a) receiving means for receiving said serial data flowing through said serial transmission line;
   (b) display format instructing means for designating a protocol or data format by which the received serial data are displayed;
   (c) first conversion means for converting said receiving serial data into display data according to the designated protocol or data format;
   (d) memory means for storing said serial data or said display data;
   (e) reading means for reading out said serial data or said display data from said memory means;
   (f) displaying means for accepting said serial data or said display data read out from said reading means to display visually said serial data or said display data on a display screen;
   (g) code specifying means for specifying a code, so that data to be displayed on said display means is converted into data in said code;
   (h) second conversion means for converting data to be displayed on said display means according to said code specified by said code specifying means; and
   (i) output means for displaying the output from said second conversion means on said display screen of said display means.

2. A monitoring system for a serial transmission line as claimed in claim 1, wherein said second conversion means has a cursor control means for instructing a range of data to be displayed on said display screen, the code of which should be converted, and a code conversion means for converting only data within said range according to said code.

3. A monitoring system for a serial transmission line as claimed in claim 1, wherein said output means has a video memory for storing data converted by said second conversion means, and which further comprises switching means for switching display data supplied to said display means to data in said video memory in case that the conversion by said second conversion means is being instructed.

4. A monitoring system for a serial transmission line as claimed in claim 2, wherein said output means has a video memory for storing data converted by said second conversion means, and which further comprises switching means for switching display data supplied to said display mean to data in said video memory in case that the conversion by said second conversion means is being instructed.

5. A monitoring system for a serial transmission line for receiving serial data of said serial transmission line and for displaying said data comprising:
   (a) receiving means for receiving said serial data flowing through said serial transmission line;
   (b) display format instructing means for designating a protocol or data format by which the received serial data are displayed;
   (c) first conversion means for converting said received serial data into display data according to the designated protocol or data format;
   (d) memory means for storing said serial data or said display data;
   (e) reading means for reading out said serial data or said display data from said memory means;

(f) displaying means for accepting said serial data or said display data read out from said reading means to display visually said serial data or said display data on a display screen;

(g) selecting means for selecting said serial data or said display data stored in said memory means according to an instruction input;

(h) transferring means for transferring said serial data or said display data selected by said selecting means to a specified area in said memory means so that said serial data or display data is collected in said specified area;

(i) means for storing the serial data or display data received newly in said memory means subsequent to the data transferred by said transferring means to said specified area.

(j) code specifying means for specifying a code, so that the data to be displayed on said display means is converted into data in said code;

(k) second conversion means for converting data to be displayed on said display means according to said code specified by said code specifying means; and (l) output means for displaying the output from said second conversion means on said display screen of said display means.

6. A monitoring system for a serial transmission line as claimed in claim 5, wherein said selecting means has means for selecting said serial data or said display data according to a designation by a unit of display screen of said display means.

7. A monitoring system for a serial transmission line as claimed in claim 5, wherein said selecting means has means for selecting said serial data or said display data according to a designation of an address range of said memory means.

* * * * *